(12) United States Patent
Lee et al.

(10) Patent No.: US 11,761,682 B2
(45) Date of Patent: Sep. 19, 2023

(54) FLEXIBLE MODULE FOR COMBINING SOLAR PHOTOVOLTAIC PANEL AND SOLAR THERMAL PANEL

(71) Applicant: KOREA INSTITUTE OF ENERGY RESEARCH, Daejeon (KR)

(72) Inventors: Euy-Joon Lee, Sejong (KR); Eun-Chul Kang, Daejeon (KR); Yu-Jin Kim, Jeju-si (KR); Kwang-Seob Lee, Jecheon-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 54 days.

(21) Appl. No.: 17/440,513

(22) PCT Filed: Jan. 31, 2020

(86) PCT No.: PCT/KR2020/001545
§ 371 (c)(1),
(2) Date: Sep. 17, 2021

(87) PCT Pub. No.: WO2020/218721
PCT Pub. Date: Oct. 29, 2020

(65) Prior Publication Data
US 2022/0154977 A1    May 19, 2022

(30) Foreign Application Priority Data

Apr. 25, 2019 (KR) .......... 10-2019-0048434

(51) Int. Cl.
*H02S 30/10* (2014.01)
*F24S 20/50* (2018.01)
(Continued)

(52) U.S. Cl.
CPC .............. *F24S 20/50* (2018.05); *H02S 10/30* (2014.12); *H02S 30/10* (2014.12); *H02S 40/40* (2014.12); *H02S 40/44* (2014.12); *F24S 2020/17* (2018.05)

(58) Field of Classification Search
CPC ....... H01L 31/00–078; Y02E 10/50–60; H02S 10/00–40; H02S 20/00–32; H02S 30/00–20; H02S 40/40–44
(Continued)

(56) References Cited

U.S. PATENT DOCUMENTS

2015/0349177 A1* 12/2015 Rubio ..................... H02S 30/10
                                                                    136/246
2018/0309004 A1* 10/2018 Busse ..................... H02S 40/42

FOREIGN PATENT DOCUMENTS

| CN | 202472449 | * | 10/2012 |
| KR | 10-1103167 B1 | | 1/2012 |
| KR | 10-2018-0024411 A | | 3/2018 |

OTHER PUBLICATIONS

CN202472449 English translation (Year: 2012).*
International Search Report, issued in PCT/KR2020/001545, PCT/ISA/210, dated Dec. 9, 2020.

* cited by examiner

*Primary Examiner* — Bach T Dinh
(74) *Attorney, Agent, or Firm* — Birch, Stewart, Kolasch & Birch, LLP

(57) ABSTRACT

The present invention relates to a close-contacting module capable of bringing a solar photovoltaic panel and a thermal collector of a solar photovoltaic-thermal panel into close contact without creating an interface. The close-contacting module comprises: a plurality of elastic members (36) which provide an elastic force that presses the thermal collector (20) toward the solar photovoltaic panel (10) from the
(Continued)

backside of the thermal collector (20); a support member (35) for supporting the elastic members (36); and a pair of clips (31, 32, 33) provided at both ends of the support member (35) to fix the support member (35) to the edges of the solar photovoltaic-thermal panel (1).

20 Claims, 18 Drawing Sheets

(51) Int. Cl.
  *H02S 40/44* (2014.01)
  *H02S 10/30* (2014.01)
  *H02S 40/40* (2014.01)
  *F24S 20/00* (2018.01)
(58) Field of Classification Search
  USPC .................................................. 136/243–265
  See application file for complete search history.

FLEXIBLE MODULE FOR COMBINING SOLAR PHOTOVOLTAIC PANEL AND SOLAR THERMAL PANEL

CROSS REFERENCE TO RELATED APPLICATIONS

This application is the National Phase of PCT/KR2020/001545 filed on Jan. 31, 2020, which claims priority under 35 U.S.C. § 119(a) to Patent Application No. 10-2019-0048434 filed in the Republic of Korea on Apr. 25, 2019, all of which are hereby expressly incorporated by reference into the present application.

TECHNICAL FIELD

The present invention relates to a fastening module capable of tightly joining a photovoltaic panel and a thermal collector of a photovoltaic-thermal panel in tight contact, manufactured in an assemblable fashion, without leaving an interface.

BACKGROUND ART

A photovoltaic-thermal (PVT) panel has a structure in which a thermal collector is attached to the back surface of a photovoltaic (PV) panel to recover the heat generated from the photovoltaic panel.

Patent Documents 1 and 2 disclose a structure of such a photovoltaic-thermal panel and a structure of such a thermal collector. Conventionally, the photovoltaic panel and the thermal collector were bonded together using an adhesive.

The thermal collector must be directly in close contact with the photovoltaic panel to properly recover heat through conduction from the photovoltaic panel to the thermal collector. However, the conventional bonding structure leaves an interface of an adhesive layer between the thermal collector and the photovoltaic panel, reducing thermal conductivity from the photovoltaic panel to the thermal collector.

Further, if the temperature of the photovoltaic-thermal panel is increased by sunlight, the photovoltaic panel, which is thin and broad, may thermally expand and bulge. If the degree of thermal expansion is varied due to a difference in material between the photovoltaic panel and the thermal collector, the thermal collector, which is bonded to the photovoltaic panel, may fall off the photovoltaic panel. This may significantly reduce the effective heat exchange area of the thermal collector.

DETAILED DESCRIPTION OF THE INVENTION

Technical Problem

The present invention has been devised to solve the above problems, aiming to provide a fastening module for a photovoltaic panel and a thermal collector of a photovoltaic-thermal panel which may keep the photovoltaic panel and the thermal collector in tight contact to thus secure thermal conductivity although the photovoltaic-thermal panel is thermally expanded and deformed.

The present invention also aims to reduce manufacturing costs for photovoltaic-thermal panels by a simplified manufacturing process without using a chemical adhesive in manufacturing photovoltaic-thermal modules.

The present invention also aims to provide a fastening module for a photovoltaic panel and a thermal collector of a photovoltaic-thermal panel, which may be generally used for photovoltaic panels with different thicknesses and areas and thermal collectors with different thicknesses and areas.

The present invention also aims to provide a fastening module for a photovoltaic panel and a thermal collector, which may evenly distribute the contact force over a broad area of the thermal collector in tight contact with the back surface of the photovoltaic panel.

Technical Solution

To achieve the foregoing objectives, according to the present invention, there is provided a clip-type fastening module that provides an elastic force to push the thermal collector toward the photovoltaic panel from behind the back of the thermal collector.

The elastic force may be provided by a bow-shaped leaf spring.

A plurality of leaf springs may be connected in series along the length direction of the fastening module.

The fastening module may have an elongated shape. A plurality of fastening modules may be arranged and installed at predetermined intervals on one photovoltaic-thermal panel.

Specifically, the present invention is a fastening module 30 bringing a back surface of a photovoltaic panel 10 and a thermal collector 20 in tight contact with each other in a photovoltaic-thermal panel 1 including the photovoltaic panel 10 and the thermal collector 20 stacked one over the other.

The fastening module comprises a plurality of elastic members 36 providing an elastic force to press the thermal collector 20 from behind a back surface of the thermal collector 20 to the photovoltaic panel 10, a supporting member 35 supporting the elastic members 36, and a pair of clips provided on two opposite ends of the supporting member 35 to fix the supporting member 35 to edges of the photovoltaic-thermal panel 1.

By providing a plurality of elastic members, it is possible to apply a uniformly distributed load to the thermal collector, thereby ensuring tight contact.

The clips allow the photovoltaic panel-and-thermal collector fastening module to be fixed directly to the photovoltaic-thermal panel.

The elastic members 36 may be a leaf spring. The leaf spring may include an arc part 361 having a cross-section in a bow shape convex toward the thermal collector and fastening parts 362 provided on two opposite ends of the arc part 361.

As the fastening parts 362 are supported by the supporting member 35, the arc part 361 may press the thermal collector 20 toward the photovoltaic panel 10.

A widthwise stretchable part 37 which is stretchable or contractable in a width direction of the photovoltaic-thermal panel may be provided between fastening parts 362 of two adjacent elastic members 36.

The widthwise stretchable part allows for width adjustment of the fastening module for different sizes of photovoltaic-thermal panels.

Further, the widthwise stretchable part allows elasticity (compression force) to be distributed to the adjacent elastic members rather than being concentrated on any one elastic member when the plurality of elastic members press, so that all of the plurality of elastic members allow the thermal collector to press forward with uniform elastic force.

One end of the widthwise stretchable part 37 may be connected to the fastening part 362 of any one of the two adjacent elastic members 36, and the other end of the widthwise stretchable part 37 may be connected to the fastening part 362 of the other elastic member 36 of the two adjacent elastic members 36.

The elastic members 36 and the widthwise stretchable parts 37 may be alternately arranged along the width direction of the photovoltaic-thermal panel, and accordingly, the plurality of elastic members 36 may be connected side by side in series along the width direction of the photovoltaic-thermal panel.

The widthwise stretchable part 37 may include a wrinkled shape.

The fastening part 362 may include an engaging part 363 that engages with a protruding member 351 provided on the supporting member 35.

With the protrusion member 351 and the engaging part 363 engaged with each other, the fastening part 362 is capable of a relative slide on the supporting member in a width direction of the photovoltaic-thermal panel.

The clip may include a first clip 31 including a surface supporting member 311 in contact with a surface of the photovoltaic panel 10, a thickness-wise first extension member 312 extending from the surface supporting member 311 rearward in a thickness direction of the panel, and a first thickness adjustment part 313 provided on the thickness-wise first extension member 312, and a thickness-wise second extension member 322 connected to the supporting member 35 and extending forward in the thickness direction from the supporting member.

The clip may further include a second clip 32 including a second thickness adjustment part 323 provided on the thickness-wise second extension member 322 and a clip fixing part 33 fixing the first clip 31 and the second clip 32.

Any one of the first thickness adjustment part 313 and the second thickness adjustment part 323 may be a pin 324 extending widthwise, and the other of the first thickness adjustment part 313 and the second thickness adjustment part 323 may be a pinhole 314 penetrated widthwise to allow the pin 324 to be inserted thereinto.

A plurality of pins 324 may be provided in a front-rear direction, and a plurality of pinholes 314 may be provided in the front-rear direction, so that thickness-wise lengths of the thickness-wise first extension member 312 and the thickness-wise second extension member 322 are determined depending on how many of the plurality of pins are to be fitted into the plurality of pinholes.

The clip fixing part 33 may have a stopper structure to prevent the pin 324 from being removed from the pinhole 314.

The second clip 32 may be slidably connected to the supporting part 35. As the clip fixing part 33 fixes the first clip 31 and the second clip 32, the second clip 32 may be fixed not to slide on the supporting member 35.

The first thickness adjustment part 313 may be an elongated hole 41 extending thickness-wise in the first extension member 312, and the second thickness adjustment part 323 may be a female screw part 42 provided in the second extension member. The clip fixing part 33 may include a male screw 43 fastened through the elongated hole to the female screw part.

The first thickness adjustment part 313 and the second thickness adjustment part 323 may include serrated structures complementary to each other to allow the first clip 31 to be inserted rearward into the second clip 32 while preventing the first clip 31 from being removed forward from the second clip 32 by being stuck to each other.

Further, according to the present invention, there is provided a tight-contact photovoltaic-thermal panel structure, comprising a photovoltaic panel 10, a thermal collector 20 stacked on the photovoltaic panel 10 and contacting a back surface of the photovoltaic panel 10, and a fastening module 30 bringing the back surface of the photovoltaic panel 10 and the thermal collector 20 in tight contact with each other.

In the tight-contact photovoltaic-thermal panel structure, the elastic member 36 may be a leaf spring. The plurality of elastic members 36 may be connected side by side in series along a width direction of the photovoltaic-thermal panel.

In the tight-contact photovoltaic-thermal panel structure, a widthwise stretchable part 37 may be disposed between two adjacent elastic members 36.

In the tight-contact photovoltaic-thermal panel structure, no chemical adhesive may be disposed between the photovoltaic panel 10 and the thermal collector 20.

According to the present invention, there is also provided a method for tight contact stacking for a photovoltaic-thermal panel.

The stacking method includes stacking a thermal collector 20 on a back surface of a photovoltaic panel 10 and fixing a pair of clips of the fastening module to edges of the photovoltaic-thermal panel.

No adhesive may be applied between the photovoltaic panel 10 and the thermal collector 20 in the stacking step.

A plurality of fastening modules may be installed to be spaced apart from each other at predetermined intervals along a length direction of the photovoltaic-thermal panel.

Fixing the pair of clips to the photovoltaic-thermal panel may include adjusting a thickness-wise position of the supporting member with respect to the photovoltaic panel 10 by adjusting a thickness of the clips and fixing the clips and adjusting and positioning the clips to widthwise tightly contact the edges of the photovoltaic-thermal panel by adjusting the clips and fixing the clips.

Advantageous Effects

According to the photovoltaic panel-and-thermal collector fastening module of the present invention, since the photovoltaic panel and the thermal collector are evenly brought in tight contact with each other without leaving an interface, the thermal collection effect is greatly enhanced.

In other words, the photovoltaic-thermal panel may be manufactured without using a chemical adhesive as conventional, easily by way of an assemblable fastening module. Thus, it is possible to simplify manufacturing process and save manufacturing costs.

According to the photovoltaic panel-and-thermal collector fastening module of the present invention, even when the photovoltaic-thermal panel is thermally deformed, the photovoltaic panel and the thermal collector may be kept in tight contact, ensuring thermal conductivity.

According to the photovoltaic panel-and-thermal collector fastening module of the present invention, even when a physical or mechanical force is applied from the back surface of the thermal collector, the force is not concentrated in a specific area but may rather be evenly distributed. Thus, it is possible to prevent deformation of the photovoltaic panel and the thermal collector by the elastic force applied to bringing the thermal collector in tight contact with the photovoltaic panel.

According to the photovoltaic panel-and-thermal collector fastening module of the present invention, it is possible to reduce the thickness of the space occupied by the plurality of elastic members installed to apply distributed contact force and hence to slim down the fastening module.

The photovoltaic panel-and-thermal collector fastening module of the present invention may be put to general use for photovoltaic panels with different thicknesses and areas and thermal collectors with different thicknesses and areas and is thus easy to install and apply.

The foregoing or other specific effects of the present invention are described below in conjunction with the following detailed description of the present invention.

LEGEND OF SYMBOLS

Figure 1:
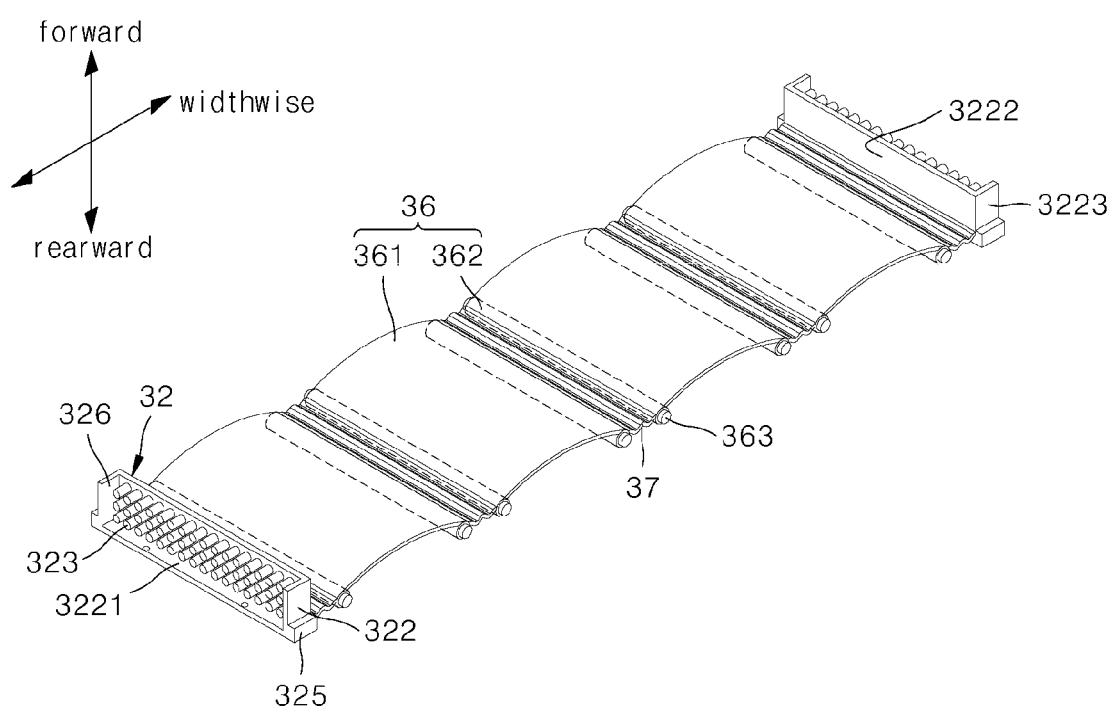
FIG. 1 is a perspective view illustrating an elastic member, a widthwise stretchable part, and a second clip provided in a fastening module of a photovoltaic-thermal panel according to the present invention.

10: ground 1: photovoltaic-thermal panel 10: photovoltaic panel 20: thermal collector 30: fastening module 31: first clip 311: surface supporting member 312: thickness-wise first extension member 313: first thickness adjustment part 314: pinhole (widthwise extension) 32: second clip 322: thickness-wise second extension member 3221: bottom member 3222: inner surface member 3223: side wall member 323: second thickness adjustment part 324: pin (widthwise extension) 325: fitting jaw 326: fixing groove 33: clip fixing part 336: stopper plate 337: fixing protrusion 35: supporting member 350: main body 351: protruding member 352: fixing hole 36: leaf spring (elastic member) 361: arc part 362: fastening part 363: engaging part 37: widthwise stretchable part 41: elongated hole 42: female screw part 43: male screw

MODE FOR CARRYING OUT THE INVENTION

Hereinafter, preferred embodiments of the present invention are described in detail with reference to the accompanying drawings.

In describing the embodiments, surface may mean a surface facing the sun, and back surface may mean a surface facing away from the surface. Forward may mean a direction toward the sun, and rearward may mean a surface away from the sun.

Widthwise may mean an extension direction of the fastening module installed on the photovoltaic-thermal panel. Lengthwise means a direction in which an elongated member extends.

According to an embodiment of the present invention, a fastening module of a photovoltaic panel and a thermal collector of a photovoltaic-thermal panel is configured to press the thermal collector forward from the back surface of the thermal collector to bring the surface of the thermal collector in tight contact with the back surface of the photovoltaic panel.

Referring to FIGS. 1 to 7, a fastening module 30 includes a supporting member 35, a plurality of elastic members 36 installed on the supporting member and supported by the supporting member, a widthwise stretchable part 37, which widthwise connects the elastic members 36 and is self-stretchable and contractable widthwise, and clips 31, 32, and 33 for fixing the supporting member 35 to the edges of a photovoltaic-thermal module.

[Supporting Member]

Figure 2:
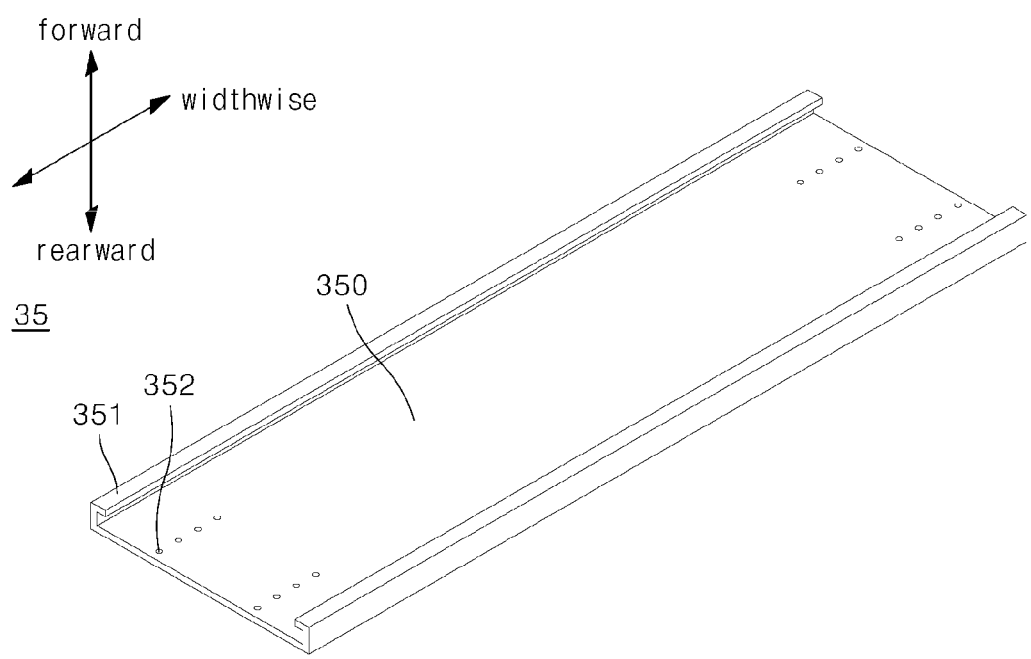
FIG. 2 is a perspective view illustrating a supporting member where the elastic member, widthwise stretchable part, and the second clip of FIG. 1 are installed.

The supporting member 35 may include a flat and elongated plate-shaped body 350 and protruding members 351 protruding from the main body 350 as illustrated in FIG. 2.

The supporting member 35 is preferably formed of a material with high strength since bending-resistance rigidity need be secured. For example, the material of the supporting member 35 may be metal or reinforced plastic.

Further, because of the need for securing bending-resistance rigidity, it is preferable that the supporting member 35 has a shape with a large section modulus (I). In the cross section of the supporting member 35, like a C-shaped steel beam, the protruding members 351 may extend and protrude from two opposite ends of the flat main body 350 in a direction perpendicular to the extension direction of the main body 350. The respective ends of the protruding members 351 may be bent inwards. In other words, by the main body 350 and the protruding members 351, two opposite ends of the supporting member 35 may have a "C"-shaped cross-section. By such a "C"-shaped cross-section, the supporting member 35 may function as a guide rail.

Fixing holes 352 may be formed in the body 350 of the supporting member 35. There may be provided a plurality of fixing holes 352 along the length direction of the supporting member. The fixing holes 352 may be provided near two opposite ends of the main body 350 and may be formed overall along the length direction of the main body 350.

[Elastic Member]

The elastic member 36 may be a leaf spring 36 including a convex bow-shaped plate material as illustrated in FIG. 1. The elastic member 36 may be formed of metal or may be formed of a synthetic resin.

The leaf spring 36 may include an arc part 361 having a bow-shaped cross section and fastening parts 362 provided on two opposite ends of the arc part 361. The fastening part 362 may have a round cylindrical shape.

The bow-shaped arc part 361 may have elasticity to be restored in a direction of being convex, and this elasticity may act as a force to push forward the thermal collector 20 in front of the arc part 361.

Engaging parts 363 protruding laterally further than the elastic member may be provided on two opposite sides of the fastening part 362. The fastening part 362 may have a hollow cylinder shape, and the engaging part 363 may have a pin shape fitted into the fastening part 362. The pin-shaped engaging part 363 is longer than the fastening part 362, so that in a state where the engaging part 363 is inserted into the fastening part 362, two opposite ends of the engaging part 363 may protrude laterally further than the fastening part 362.

A plurality of elastic members 36 may be installed in the fastening module, arranged along the width direction of the photovoltaic-thermal panel.

Figure 7:
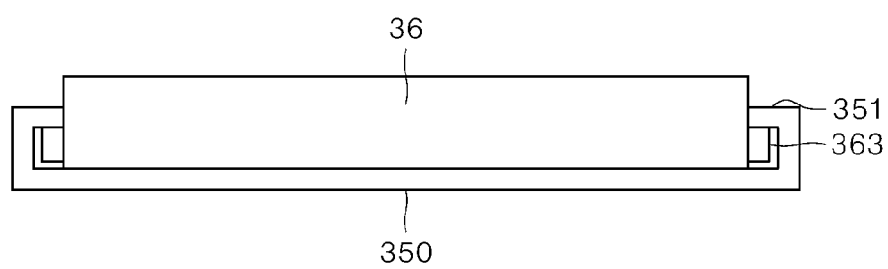
FIG. 7 is a cross-sectional view illustrating the supporting member and the elastic member of FIG. 5 as viewed in a length direction.

The engaging part 363 of the elastic member 36 may be fitted into a guide space defined by the protruding member 351 of the supporting member 35 as illustrated in FIG. 7. Accordingly, the elastic member 36 may be prevented from escaping off forward of the supporting member 35. With the elastic member 36 is fitted to the supporting member 35, the arc portion 361 of the elastic member 36 may protrude further forward than the supporting member 35.

The engaging portion 363 of the elastic member 36 may slide along the length direction of the supporting member 35. Accordingly, the elastic member 36 may also slide along the length direction of the supporting member 35.

Further, as the arc part 361 of the leaf spring is pressed or curved outwards, the pair of fastening parts 362 provided on two opposite ends of the arc part 361 may approach or move away from each other. The relative movement between the pair of fastening parts 362 may also be made along the length direction of the guide space.

The surface of the fastening part 362 may be coated with Teflon to reduce the friction coefficient and secure lubricity.

[Widthwise Stretchable Part]

The widthwise stretchable part 37 is disposed between a plurality of leaf springs 36. The widthwise stretchable part 37 is shaped to be stretchable and contractable in the width direction of the photovoltaic-thermal panel. Therefore, if the widthwise stretchable part 37 is interposed between the leaf springs 36, the distance between the two adjacent leaf springs 36 may be determined by the extension and contraction of the widthwise stretchable part 37.

The material and shape of the widthwise stretchable part 37 may be selected to enable extension and contraction. For example, even when the widthwise stretchable part 37 is formed of metal, its widthwise extension and contraction would be possible if it has a wrinkled shape as shown. Therefore, the shape of the widthwise stretchable part 37 is not necessarily limited to the shape illustrated in the drawing, and the same is also true for the material.

The widthwise stretchable part 37 may have elasticity with respect to a reference length in the width direction of the photovoltaic-thermal panel. In other words, if the widthwise stretchable part 37 becomes longer than a predetermined reference length, elastic force may occur in the direction of decreasing to the reference length and, if the widthwise stretchable part 37 becomes shorter than the predetermined reference length, elastic force may occur in the direction of increasing to the reference length. The wrinkled shape may implement such elasticity.

A plurality of elastic members 36 and a plurality of widthwise stretchable parts 37 are alternately arranged, and the plurality of elastic members 36 are slidable on the supporting member 35. Therefore, the plurality of widthwise stretchable parts 37 may be evenly extended or contracted, rather than extension and contraction concentrating onto any one widthwise stretchable part 37.

The action of the widthwise stretchable part 37 also affects the elastic force of the elastic member 36. In other words, if increased or decreased elasticity acts to any one of the plurality of elastic members 36, the width of the bow-shaped arc part 361 of the elastic member 36 is increased or decreased. The change in width of the arc part 361 affects the neighboring elastic members 36 through the widthwise stretchable part 37.

For example, if any one of the elastic members 36 is widened by receiving increased elasticity, its neighboring elastic members 36 are narrowed and increased in elasticity, thus relieving the elasticity to the elastic member 36 receiving increased elasticity.

The widthwise stretchable part 37 may be simply interposed between two elastic members 36 or may be fastened or connected to the two adjacent elastic members 36.

For example, one end of the widthwise stretchable part 37 may be connected to the fastening part 362 of any one of the two adjacent elastic members 36, and the other end of the widthwise stretchable part 37 may be connected to the fastening part 362 of the other elastic member 36 of the two adjacent elastic members 36.

The elastic members 36 and the widthwise stretchable parts 37 may be alternately connected along the width direction of the photovoltaic-thermal panel, and accordingly, the plurality of elastic members 36 may be connected side by side in series along the width direction of the photovoltaic-thermal panel.

[Clip]

The clips include a first clip 31 for fixing the photovoltaic panel 10, a second clip 32 connected to the first clip 31 to support the supporting member 35 toward the photovoltaic panel 10, and a clip fixing part 33 for supporting the fastened state of the first clip 31 and the second clip 32.

Figure 3:
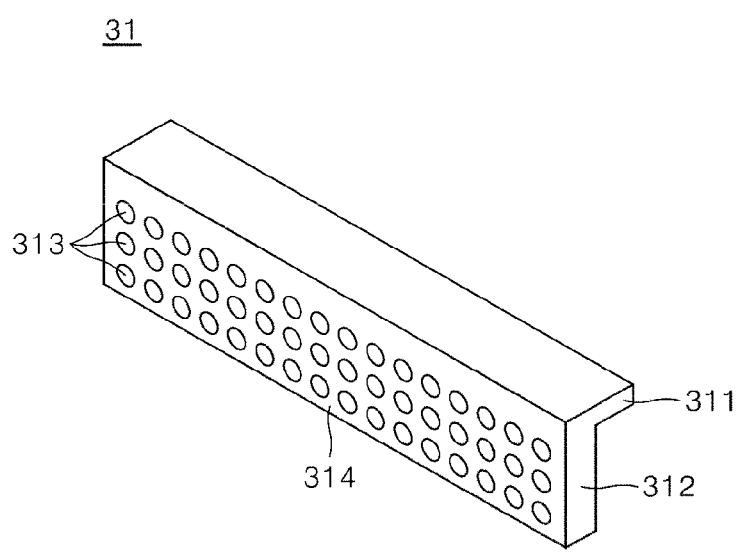
FIG. 3 is a perspective view illustrating a first clip fastened to a second clip.

Referring to FIG. 3, the first clip 31 includes a surface supporting member 311 in contact with the surface of the photovoltaic panel 10, a thickness-wise first extension member 312 extending from the surface supporting member 311 rearward in the thickness direction of the panel, and a first thickness adjustment part 313 provided on the thickness-wise first extension member 312.

The surface supporting member 311 is a portion in contact with an edge of the surface of the photovoltaic panel 10. A gasket (not shown) may be interposed between the surface supporting member 311 and the photovoltaic panel 10.

To secure the rigidity of the first clip 31, it may be formed of a metal or a synthetic resin material with high rigidity.

The first thickness adjustment part 313 may include a plurality of pinholes 314. The pinhole 314 may be formed in the thickness-wise first extension member 312 to extend in the width direction of the photovoltaic-thermal panel. The plurality of pinholes 314 may be provided in a plurality of layers in the thickness direction, or a plurality of pinholes 314 may be provided in a lateral direction.

The second clip 32 may include a thickness-wise second extension member 322 connected to the supporting member 35 and extending forward in the thickness direction from the supporting member and a second thickness adjustment part 323 provided on the thickness-wise second extension member 321.

The thickness-wise second extension member 322 may be shaped to be open upward and outwardly in the width direction of the photovoltaic-thermal panel. The thickness-wise second extension member 322 may include a bottom member 3221 defining a bottom surface, an inner member 3222 defining a widthwise inner surface of the photovoltaic-thermal panel, and side wall members 3223 defining two opposite side surfaces crossing both the bottom surface and the widthwise inner surface of the photovoltaic-thermal panel.

The second thickness adjustment part 323 may include a plurality of pins 324. The plurality of pins 324 may be provided in the thickness-wise second extension member 321, in the form of extending from the inner surface member 3222 to the outside in the width direction of the photovoltaic-thermal panel. The cross-sectional shape of the plurality of pins 324 may correspond to the cross-sectional shape of the pinholes 314.

The plurality of pinholes 314 may have the same shape, and the plurality of pins 324 may also have the same shape. Accordingly, it is possible to adjust the number of layers in which the plurality of pinholes 314 and the pins 324 are fitted to each other (see FIGS. 9 and 10), thereby enabling thickness-wise dimension control of the clips.

Fitting jaws 325 are formed on the outer surfaces of the two side wall members 3223. The fitting jaws 325 are fitted into the guide spaces formed by the protruding members 351 of the supporting member 35 (see FIG. 6). Accordingly, the second clip 32 is fixed to the supporting member 35 to be prevented from escaping off forward from the supporting member 35 and to be slidable along the length direction of the supporting member 35. With the second clip 32 installed on the supporting member 35, the second clip 32 projects further forward than the supporting member 35.

Fixing grooves 326 extending thickness-wise are formed in the inner surfaces of the two side wall members 3223 of the thickness-wise second extension member 322. The fixing grooves 326 provide groove shapes into which the clip fixing part 33 is fitted.

Figure 4:
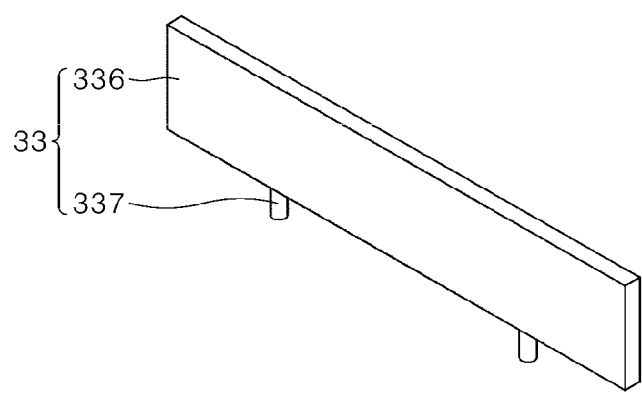
FIG. 4 is a perspective view illustrating a clip fixing part for fixing a first clip and a second clip.

Referring to FIG. 4, the clip fixing part 33 may have a shape of a stopper plate 336 two opposite ends of which are fitted into the fixing grooves 326. If the clip fixing part 33 is fitted into the second clip 32, with the first clip 31 and the second clip 32 fitted together, the first clip 31 is prevented from escaping off the second clip 32. In other words, the clip fixing part 33 prevents movement in the escaping direction of the first clip 31.

The stopper plate 336 of the clip fixing part 33 may have fixing protrusions 337 that extend in the insertion direction of the clip fixing part 33. The fixing protrusions 337 may be fitted into the fixing holes 352 of the supporting member 337. An avoiding groove through which the fixing protrusions 337 may pass may be provided in the bottom member 3221 of the third clip 32. If the fixing protrusions 337 are fitted into the fixing holes 352 (see FIG. 13), the second clip 32 is fixed not to further slide on the supporting member 35.

Second clips 32 may be installed on two opposite ends of the structure in which the plurality of leaf springs 36 and widthwise stretchable parts 37 are installed alternately. The second clip 32 may first be connected to the widthwise stretchable part 37, as shown, or may alternatively be connected first to the elastic member.

[Fastening of Fastening Module]

A method for fastening the fastening module and a structure of a photovoltaic-thermal panel to which the fastening module is fastened are described below with reference to FIGS. 8 to 16.

Figure 5:
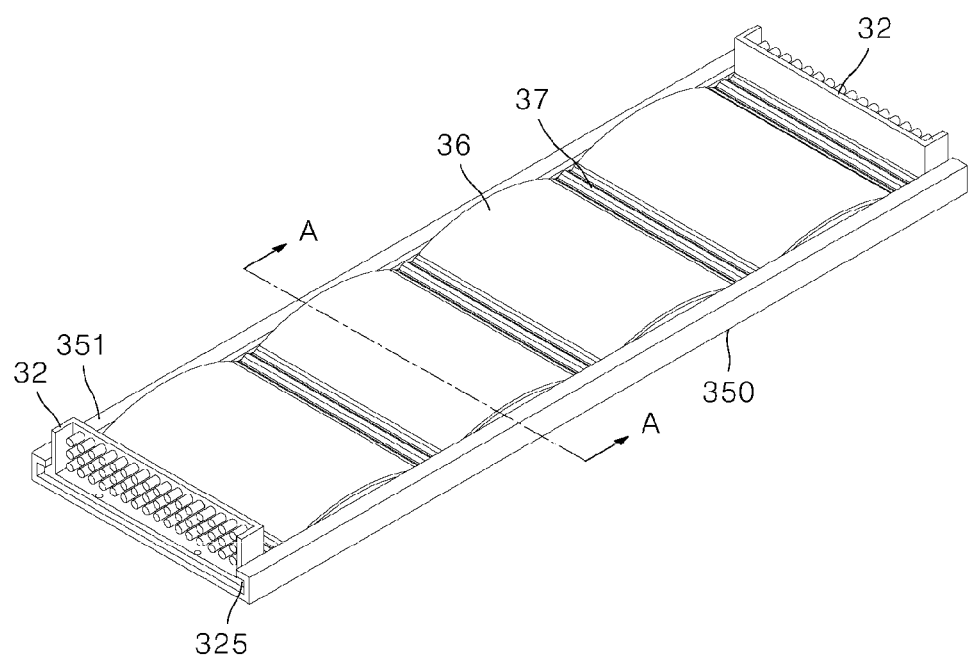
FIG. 5 is a perspective view illustrating a state in which the elastic member, widthwise stretchable part, and second clip of FIG. 1 are installed on the supporting member of FIG. 2.
Figure 6:
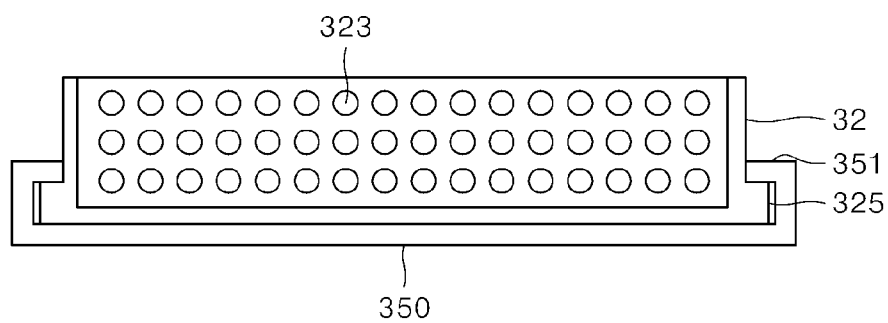
FIG. 6 is a view illustrating the supporting member and the second clip of FIG. 5 as viewed in a length direction.
Figure 8:
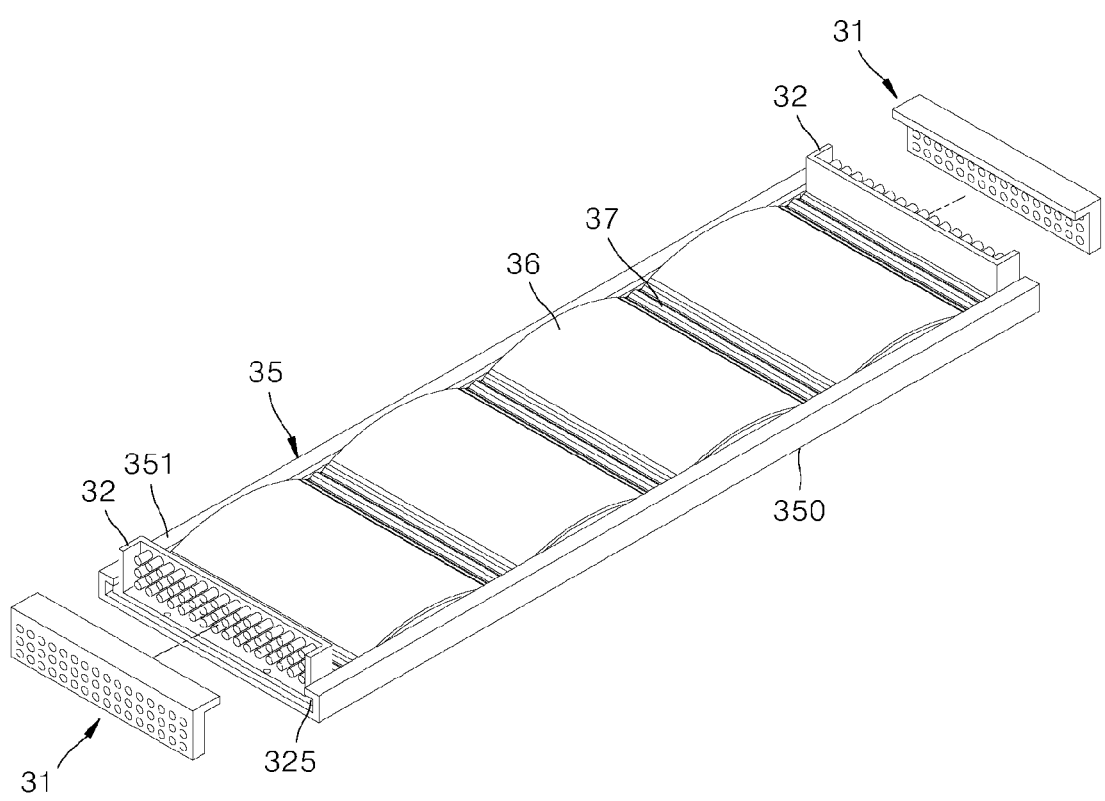
FIG. 8 is a view illustrating a process in which the first clip is fixed to the second clip of FIG. 5.
Figure 9:
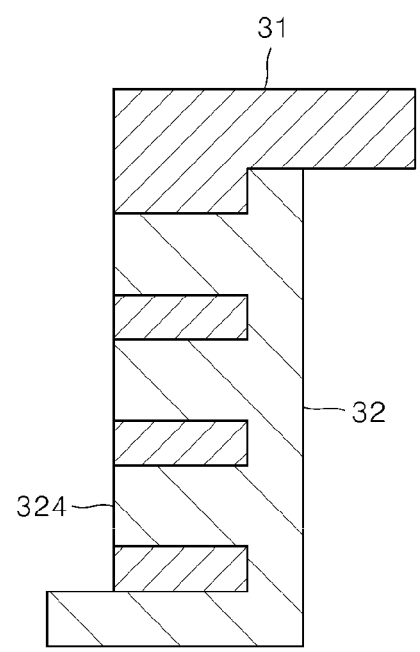
FIG. 9 is a side cross-sectional view illustrating a state in which the second clip of FIG. 8 is installed on the first clip at the lowest level.
Figure 10:
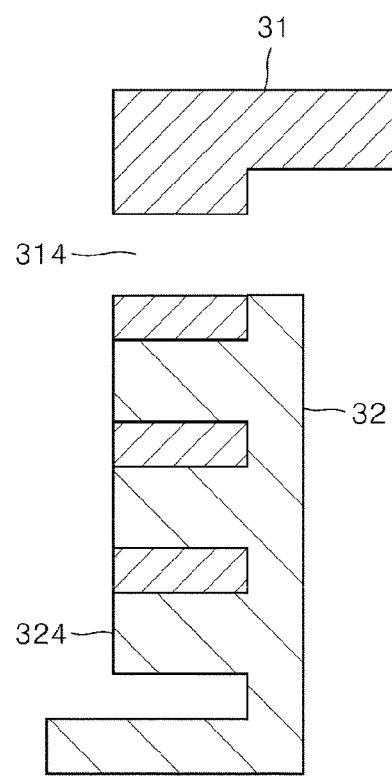
FIG. 10 is a side cross-sectional view illustrating a state in which the second clip of FIG. 8 is installed on the first clip at a higher level than that of FIG. 9.
Figure 11:
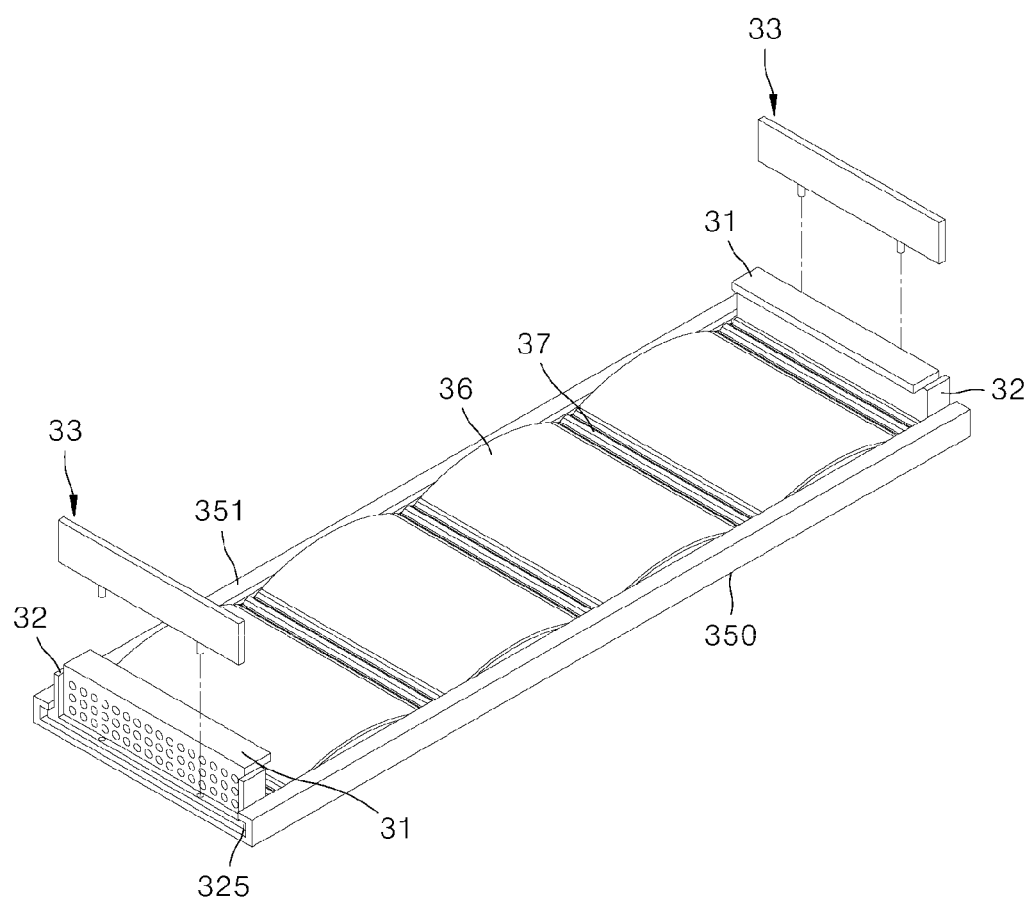
FIG. 11 is a view illustrating a process of installing a clip fixing part, with the first clip and the second clip fastened to each other.
Figure 12:
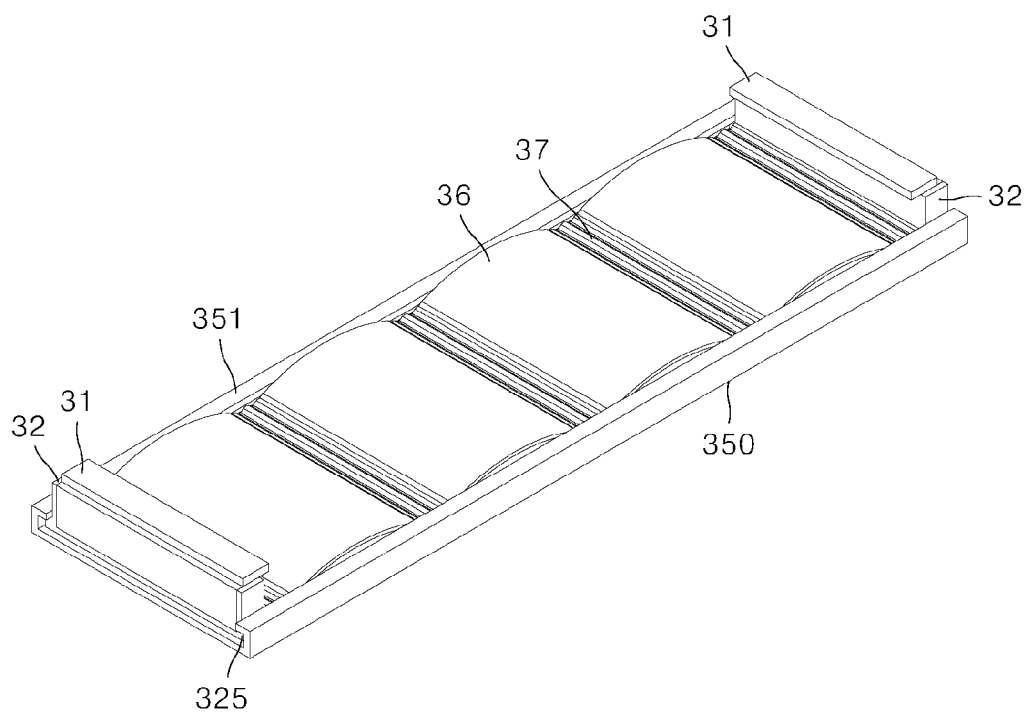
FIG. 12 is a view illustrating a state in which a first clip and a second clip are fixed by a clip fixing part.
Figure 13:
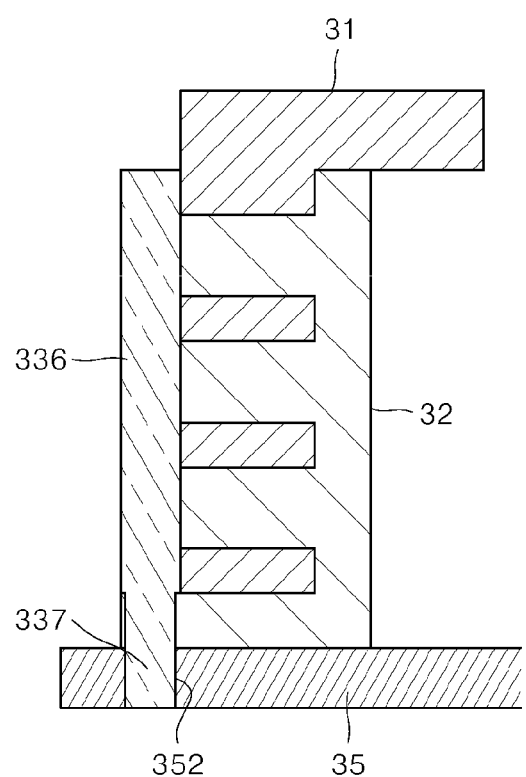
FIG. 13 is a cross-sectional view illustrating a clip portion of FIG. 12.
Figure 14:
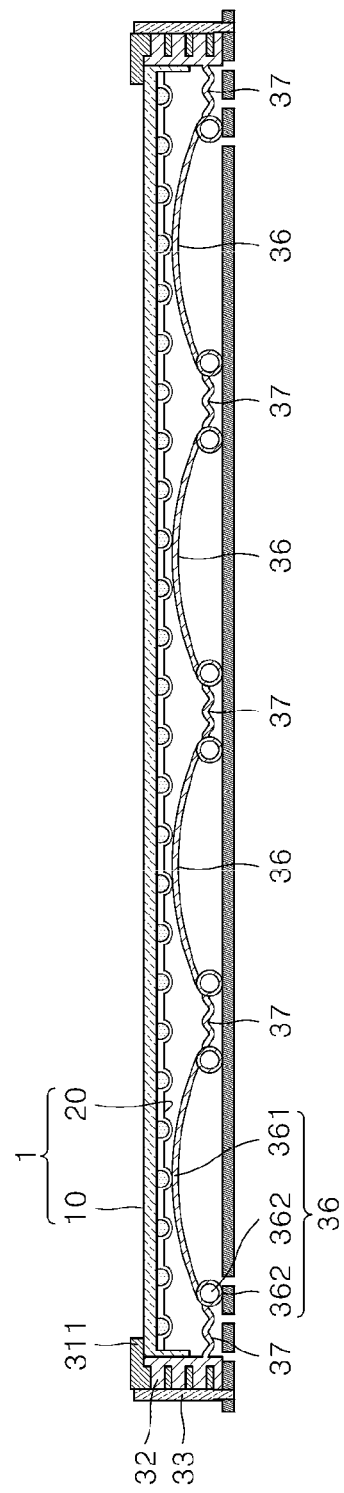
FIG. 14 is a side view illustrating a photovoltaic-thermal panel with a photovoltaic panel and a thermal collector brought in tight contact by a fastening module.
Figure 15:
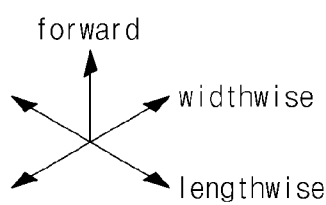
FIG. 15 is a perspective view illustrating a photovoltaic-thermal panel with a photovoltaic panel and a thermal collector brought in tight contact by a fastening module, as viewed from the photovoltaic panel.
Figure 15:
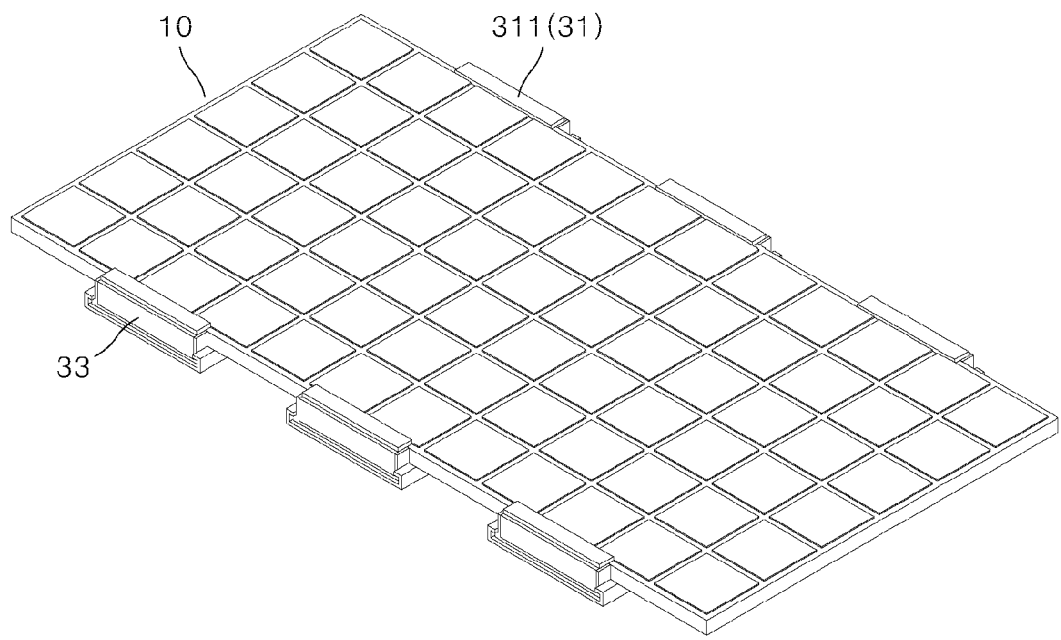
Figure 16:
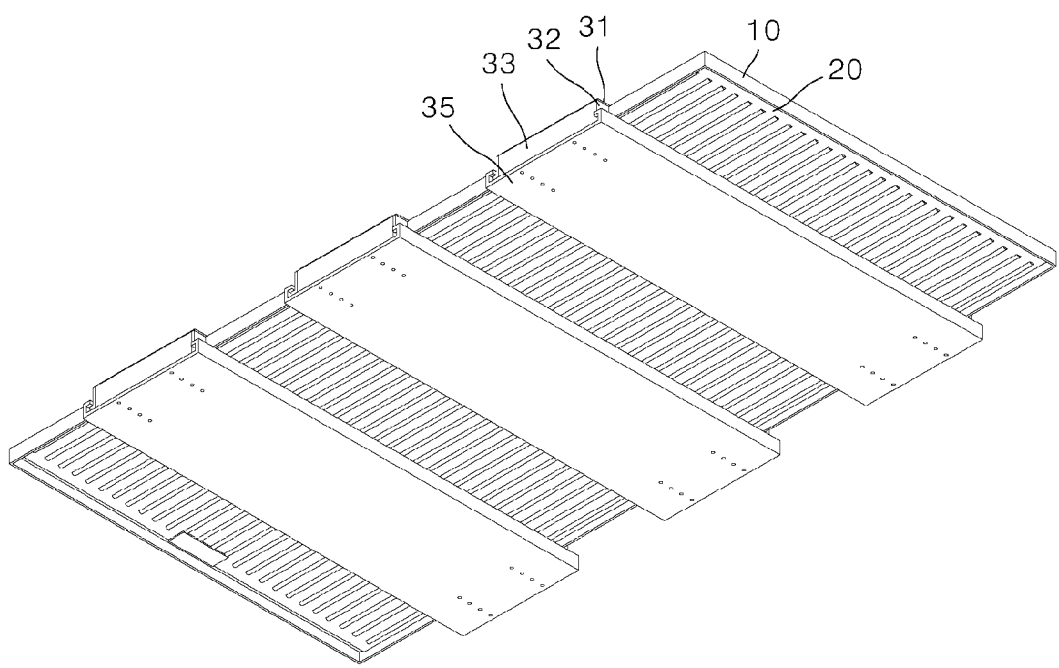
FIG. 16 is a perspective view illustrating a photovoltaic-thermal panel with a photovoltaic panel and a thermal collector brought in tight contact by a fastening module, as viewed from the thermal collector.

FIG. 8 is a view illustrating a process in which the first clip is fixed to the second clip of FIG. 5. FIG. 9 is a side cross-sectional view illustrating a state in which the second clip of FIG. 8 is installed on the first clip at the lowest level. FIG. 10 is a side cross-sectional view illustrating a state in which the second clip of FIG. 8 is installed on the first clip at a higher level than that of FIG. 9. FIG. 11 is a view illustrating a process of installing a clip fixing part, with the first clip and the second clip fastened to each other. FIG. 12 is a view illustrating a state in which a first clip and a second clip are fixed by a clip fixing part. FIG. 13 is a cross-sectional view illustrating a clip portion of FIG. 12. FIG. 14 is a side view illustrating a photovoltaic-thermal panel with a photovoltaic panel and a thermal collector brought in tight contact by a fastening module. FIG. 15 is a perspective view illustrating a photovoltaic-thermal panel with a photovoltaic panel and a thermal collector brought in tight contact by a fastening module, as viewed from the photovoltaic panel. FIG. 16 is a perspective view illustrating a photovoltaic-thermal panel with a photovoltaic panel and a thermal collector brought in tight contact by a fastening module, as viewed from the thermal collector.

For convenience of description, FIGS. 8 to 13 illustrate a state in which the photovoltaic-thermal panel has been omitted so as to show the fastening module.

First, referring to FIG. 8, prepared is the supporting member 35 where the plate springs 36 and the widthwise stretchable parts 37 and the second clips 32 are slidably fitted.

With the photovoltaic panel 10 and the thermal collector 20 in contact with each other, the supporting member 35 of FIG. 8 is installed on the back surface of the thermal collector 20. Accordingly, the back surface of the thermal collector 20 and the surfaces of the arc parts 361 of the elastic members 36 come into contact with each other.

The second clips 32 installed on two opposite ends of the supporting member 35 are exposed at two opposite widthwise ends of the photovoltaic-thermal panel 1. In this state, the first clips 31 are fitted into the second clips 32 as illustrated in FIG. 8. At this time, the surface supporting member 311 of the first clip 31 is allowed to support the edge of the surface of the photovoltaic panel 10. Of course, a gasket may be interposed between the surface supporting member 311 and the surface of the photovoltaic panel 10.

The thickness of the photovoltaic panel 10 and the thermal collector 20 may vary according to manufacturers. Therefore, the thickness of the clips 31 and 32 may be adjusted by adjusting the number of layers in which the pins 324 are fitted into the pinholes 314 upon coupling the second clip 32 and the first clip 31, as illustrated in FIG. 9 or 10.

The clip fixing parts 33 are coupled as illustrated in FIG. 11, with the edges of the photovoltaic-thermal panel 1 constrained by the first clips 31 by fitting the first clips 31 and the second clips 32. Before coupling the clip fixing part 33, the second clip 32 is in a slidable state along the length direction of the supporting member 35. Thus, the clip fixing part 33 is installed as illustrated in FIG. 11, in the state in which the second clip 32 has been positioned to contact the side surface of the photovoltaic-thermal panel 1.

Then, as illustrated in FIGS. 12 and 13, the clip fixing part 33 fixes the first clip 31 and the second clip 32 not to be separated from each other while stopping the second clip 32 from a further slide on the supporting member 35.

As illustrated in FIGS. 15 and 16, fastening modules 30 are installed at predetermined intervals on the photovoltaic-thermal panel 1. Thus, the thermal collector 20 may tightly contact the photovoltaic panel 10 evenly over the entire area of the panel. Therefore, the thermal collector 20 and the photovoltaic panel 10 may be brought in tight contact with each other even without an adhesive layer between the thermal collector 20 and the photovoltaic panel 10.

Further, although the photovoltaic panel 10 is deformed by solar heat, the elasticity of the elastic member 36, which is increased by the deformation of the photovoltaic panel 10, is transferred to other elastic members 36 through the widthwise stretchable parts 37, so that the plurality of elastic members 36 may continuously exert the force of bringing the thermal collector in tight contact with the photovoltaic panel 10.

Meanwhile, various modifications may be made to the structure of adjusting the thickness of the fastening module 30. Modified examples are shown in FIGS. 17 and 18.

Figure 17:
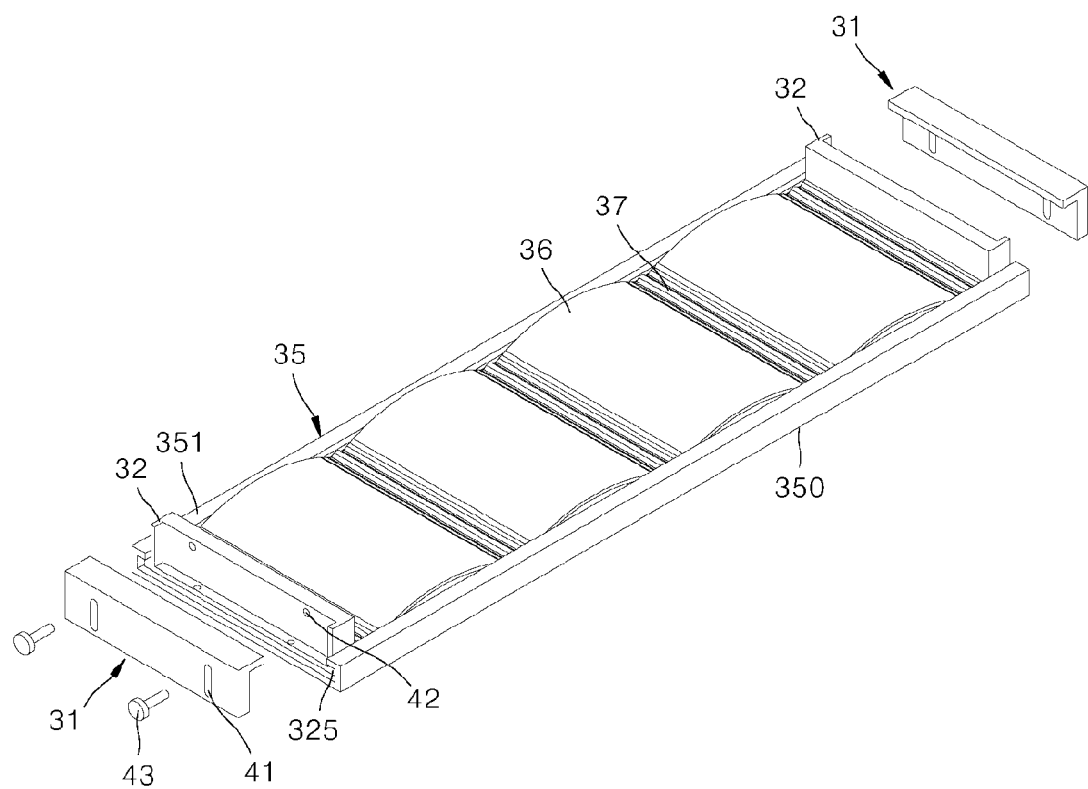
FIGS. 17 and 18 are perspective views illustrating other embodiments of the clip.

Referring to FIG. 17, elongated holes 41 extending thickness-wise may be formed as a first thickness adjustment part of the first clip 31, and female screw parts 42 may be formed as a second thickness adjustment part of the second clip 32. If male screws 43, as the clip fixing parts 33 are allowed to pass through the elongated holes 41 into the female screw parts 42, the first clip 31 may be fixed to the second clip 32, with the thickness-wise position of the first clip 31 adjusted with respect to the second clip 32.

Figure 18:
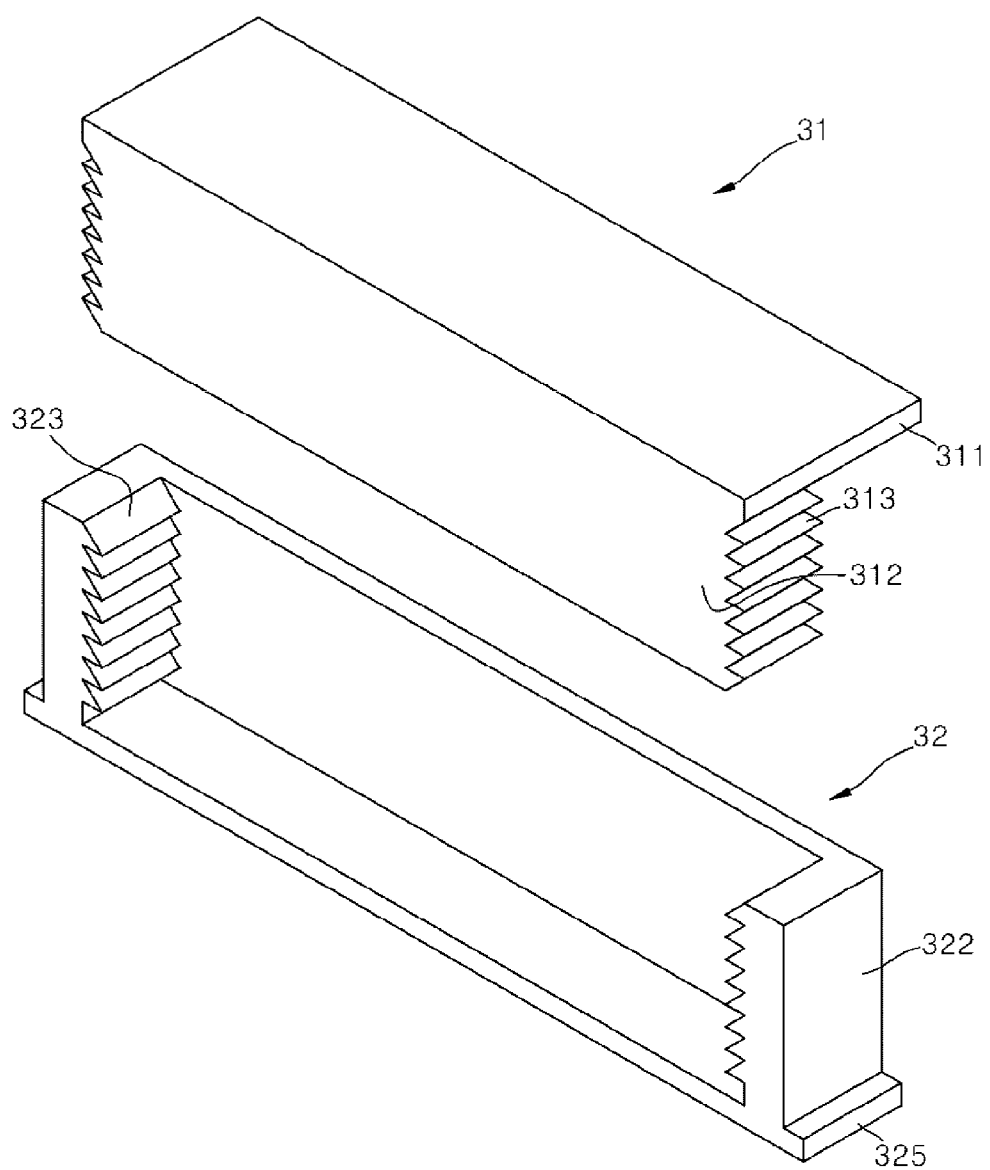

Referring to FIG. 18, serrated structures may be formed, as the first thickness adjustment part 313 of the first clip 31, on two opposite side surfaces of the thickness-wise first extension member 312, and serrated structures, complimentary to the serrated structures, may be formed, as the second thickness adjustment part 323 of the second clip 32, on the inner side surfaces of the thickness-wise second extension member 322. Thus, the first clip 31 may be smoothly inserted to the second clip 32 but may be prevented from being removed from the second clip 32 by being stuck thereto. In the structure as illustrated in FIG. 18, clip fixing parts having the same structure as those illustrated in FIGS. 1 to 16 may be used.

While the present invention has been shown and described with reference to exemplary embodiments thereof, it will be apparent to those of ordinary skill in the art that various changes in form and detail may be made thereto without departing from the spirit and scope of the present invention as defined by the following claims.

Further, although operations and effects according to the configuration of the present invention are not explicitly described in the foregoing detailed description of embodiments, it is apparent that any effects predictable by the configuration also belong to the scope of the present invention.

The invention claimed is:

1. A fastening module configured to tightly join a photovoltaic panel and a thermal collector, the fastening module bringing a back surface of the photovoltaic panel and the thermal collector in tight contact with each other in a photovoltaic-thermal panel including the photovoltaic panel and the thermal collector stacked one over the other, the fastening module comprising:
a plurality of elastic members providing an elastic force to press the thermal collector from behind a back surface of the thermal collector to the photovoltaic panel;
a supporting member supporting the plurality of elastic members; and
a pair of clips provided on two opposite ends of the supporting member to fix the supporting member to edges of the photovoltaic-thermal panel,
wherein the plurality of elastic members are connected side by side in series along a width direction of the photovoltaic-thermal panel, and
wherein a widthwise stretchable part is provided between two adjacent elastic members among the plurality of elastic members.

2. The fastening module of claim 1, wherein each of the plurality of elastic members is a leaf spring, wherein the leaf spring includes:
an arc part having a cross-section in a bow shape convex toward the thermal collector; and
fastening parts provided on two opposite ends of the arc part, and
wherein when the fastening parts are supported by the supporting member, the arc part presses the thermal collector toward the photovoltaic panel.

3. The fastening module of claim 2, wherein the widthwise stretchable part is stretchable or contractable in the width direction of the photovoltaic-thermal panel, and
wherein the widthwise stretchable part is provided between the fastening parts of the two adjacent elastic members.

4. The fastening module of claim 3, wherein a first end of the widthwise stretchable part is connected with a fastening part of any one of the two adjacent elastic members, and
wherein a second end of the widthwise stretchable part is connected with a fastening part of a different one of the two adjacent elastic members.

5. The fastening module of claim 3, wherein the plurality of elastic members and the widthwise stretchable part are alternately arranged along the width direction of the photovoltaic-thermal panel.

6. The fastening module of claim 3, wherein the widthwise stretchable part includes a wrinkled shape.

7. The fastening module of claim 2, wherein the fastening part includes an engaging part that engages with a protruding member provided on the supporting member, and
wherein with the protrusion member and the engaging part engaged with each other, the fastening part is capable of a relative slide on the supporting member in the width direction of the photovoltaic-thermal panel.

8. The fastening module of claim 1, wherein the pair of clips includes:
a first clip including a surface supporting member in contact with a surface of the photovoltaic panel, a thickness-wise first extension member extending from the surface supporting member rearward in a thickness direction of the photovoltaic panel, and a first thickness adjustment part provided on the thickness-wise first extension member;
a second clip including a thickness-wise second extension member connected to the supporting member and extending forward in the thickness direction from the supporting member and a second thickness adjustment part provided on the thickness-wise second extension member; and
a clip fixing part fixing the first clip and the second clip.

9. The fastening module of claim 8, wherein any one of the first thickness adjustment part and the second thickness adjustment part is a pin extending widthwise, and a different one of the first thickness adjustment part and the second thickness adjustment part is a pinhole penetrated widthwise to allow the pin to be inserted thereinto, and wherein a plurality of pins are provided in a front-rear direction, and a plurality of pinholes are provided in the front-rear direction, so that thickness-wise lengths of the thickness-wise first extension member and the thickness-wise second extension member are determined depending on how many of the plurality of pins are to be fitted into the plurality of pinholes.

10. The fastening module of claim 9, wherein the clip fixing part has a stopper structure to prevent the pin from being removed from the pinhole.

11. The fastening module of claim 8, wherein the second clip is slidably connected to the supporting member, and wherein when the clip fixing part fixes the first clip and the second clip, the second clip is fixed not to slide on the supporting member.

12. The fastening module of claim 8, wherein the first thickness adjustment part is an elongated hole extending thickness-wise in the thickness-wise first extension member, wherein the second thickness adjustment part is a female screw part provided in the thickness-wise second extension member, and wherein the clip fixing part includes a male screw fastened through the elongated hole to the female screw part.

13. The fastening module of claim 8, wherein the first thickness adjustment part and the second thickness adjustment part include serrated structures complementary to each other to allow the first clip to be inserted rearward into the second clip while preventing the first clip from being removed forward from the second clip by being stuck to each other.

14. A tight-contact photovoltaic-thermal panel structure, comprising:

a photovoltaic panel;
a thermal collector stacked on the photovoltaic panel and contacting a back surface of the photovoltaic panel; and
a fastening module bringing the back surface of the photovoltaic panel and the thermal collector in tight contact with each other,
wherein the fastening module comprises:
a plurality of elastic members providing an elastic force to press the thermal collector from behind a back surface of the thermal collector to the photovoltaic panel;
a supporting member supporting the plurality of elastic members; and
a pair of clips provided on two opposite ends of the supporting member to fix the supporting member to edges of a photovoltaic-thermal panel,
wherein the plurality of elastic members are connected side by side in series along a width direction of the photovoltaic-thermal panel, and
wherein a widthwise stretchable part is disposed between two adjacent elastic members among the plurality of elastic members.

15. The tight-contact photovoltaic-thermal panel structure of claim 14, wherein each of the plurality of elastic members is a leaf spring.

16. The tight-contact photovoltaic-thermal panel structure of claim 14, wherein no chemical adhesive is disposed between the photovoltaic panel and the thermal collector.

17. A method for tight-contact stacking for the photovoltaic-thermal panel, the method comprising:

stacking the thermal collector on the back surface of the photovoltaic panel; and
fixing the pair of clips of the fastening module of claim 1 to the edges of the photovoltaic-thermal panel,
wherein the fixing the pair of clips of the fastening module to the edges of the photovoltaic-thermal panel includes:
adjusting a thickness-wise position of the supporting member with respect to the photovoltaic panel by adjusting a thickness of the pair of clips and fixing the pair of clips; and
adjusting and positioning the pair of clips to widthwise tightly contact the edges of the photovoltaic-thermal panel by adjusting the pair of clips and fixing the pair of clips.

18. The method of claim 17, wherein no adhesive is applied between the photovoltaic panel and the thermal collector in the stacking.

19. The method of claim 17, wherein a plurality of fastening modules are installed to be spaced apart from each other at predetermined intervals along a length direction of the photovoltaic-thermal panel.

20. A fastening module configured to tightly join a photovoltaic panel and a thermal collector, the fastening module bringing a back surface of the photovoltaic panel and the thermal collector in tight contact with each other in a photovoltaic-thermal panel including the photovoltaic panel and the thermal collector stacked one over the other, the fastening module comprising:

a plurality of elastic members providing an elastic force to press the thermal collector from behind a back surface of the thermal collector to the photovoltaic panel;
a supporting member supporting the plurality of elastic members; and
a pair of clips provided on two opposite ends of the supporting member to fix the supporting member to edges of the photovoltaic-thermal panel,
wherein the plurality of elastic members are connected side by side in series along a width direction of the photovoltaic-thermal panel, and
wherein the pair of clips includes:
a first clip including a surface supporting member in contact with a surface of the photovoltaic panel, a thickness-wise first extension member extending from the surface supporting member rearward in a thickness direction of the photovoltaic panel, and a first thickness adjustment part provided on the thickness-wise first extension member;
a second clip including a thickness-wise second extension member connected to the supporting member and extending forward in the thickness direction from the supporting member and a second thickness adjustment part provided on the thickness-wise second extension member; and
a clip fixing part fixing the first clip and the second clip.

* * * * *